US008819823B1

(12) United States Patent
Banerjee

(10) Patent No.: US 8,819,823 B1
(45) Date of Patent: Aug. 26, 2014

(54) METHOD AND APPARATUS FOR NOTIFYING A RECIPIENT OF A THREAT WITHIN PREVIOUSLY COMMUNICATED DATA

(75) Inventor: Anindya Banerjee, Pune (IN)

(73) Assignee: Symantec Corporation, Mountain View, CA (US)

( * ) Notice: Subject to any disclaimer, the term of this patent is extended or adjusted under 35 U.S.C. 154(b) by 1104 days.

(21) Appl. No.: 12/131,702

(22) Filed: Jun. 2, 2008

(51) Int. Cl.
| G06F 11/00 | (2006.01) |
| G06F 12/14 | (2006.01) |
| G06F 12/16 | (2006.01) |
| G08B 23/00 | (2006.01) |
| G06F 3/00 | (2006.01) |
| G06F 9/44 | (2006.01) |
| G06F 9/46 | (2006.01) |
| G06F 13/00 | (2006.01) |
| H04L 29/06 | (2006.01) |

(52) U.S. Cl.
CPC ........ H04L 63/1416 (2013.01); H04L 63/1441 (2013.01)
USPC ............................................ 726/23; 719/311

(58) Field of Classification Search
CPC .................... H04L 63/1416; H04L 63/1441
USPC ............................................. 719/311; 726/23
See application file for complete search history.

(56) References Cited

U.S. PATENT DOCUMENTS

| 7,890,619 | B2* | 2/2011 | Morota et al. ................ 709/224 |
| 2002/0147915 | A1* | 10/2002 | Chefalas et al. ............. 713/188 |
| 2003/0200460 | A1* | 10/2003 | Morota et al. ................ 713/200 |
| 2004/0168085 | A1* | 8/2004 | Omote et al. ................. 713/201 |
| 2007/0094725 | A1* | 4/2007 | Borders ......................... 726/22 |
| 2007/0220602 | A1* | 9/2007 | Ricks et al. .................... 726/22 |
| 2007/0275741 | A1* | 11/2007 | Bian et al. .................... 455/466 |
| 2008/0201722 | A1* | 8/2008 | Sarathy ........................ 719/311 |
| 2008/0201772 | A1* | 8/2008 | Mondaeev et al. ............ 726/13 |
| 2008/0244745 | A1* | 10/2008 | Hrabik et al. ................... 726/23 |
| 2009/0119681 | A1* | 5/2009 | Bhogal et al. ................ 719/318 |
| 2009/0249484 | A1* | 10/2009 | Howard et al. ................ 726/24 |
| 2010/0031358 | A1* | 2/2010 | Elovici et al. .................. 726/24 |

OTHER PUBLICATIONS

Ibrahim K. El-Far • Richard Ford • Attila Ondi Manan Pancholi Suppressing the spread of email malcode using short-term message recall Published online: Sep. 17, 2005.*
El-Far, Ibrahim K. et al., "Suppressing the spread of email malcode using short-term message recall," Preview (1 page), Journal in Computer Virology (2005), Published online: Sep. 17, 2005.

* cited by examiner

Primary Examiner — Kambiz Zand
Assistant Examiner — Benjamin Kaplan
(74) Attorney, Agent, or Firm — Wilmer Cutler Pickering Hale and Dorr LLP

(57) ABSTRACT

A method and apparatus for notifying a recipient of a threat within previously communicated data is described. In one embodiment, network activity amongst at least two computer is analyzed to determine a threat communicated to a computer of the at least two computers. Furthermore, the computer is notified as to the previous communication of the threat.

17 Claims, 4 Drawing Sheets

US 8,819,823 B1

METHOD AND APPARATUS FOR NOTIFYING A RECIPIENT OF A THREAT WITHIN PREVIOUSLY COMMUNICATED DATA

BACKGROUND OF THE INVENTION

1. Field of the Invention

Embodiments of the present disclosure generally relate to a method and apparatus for alerting one or more recipients that a threat was transmitted along with previously communicated data, such as a message.

2. Description of the Related Art

In a typical computer system, there are many potential threats (e.g., malicious software code or malware (e.g., viruses, worms, Trojans and the like), spyware, PHISH, SPAM and/or the like) to one or more computers. A potential threat may be a network-based threat that is distributed throughout the typical computer system. For example, the network-based threat may comprise malware that is designed to propagate through a computer network using numerous techniques, such as attaching to outbound data, such as outbound message data (e.g., emails, instant messages and the like), hiding in a process that uses network resources in order to be distributed among other computers in communication with the infected computer, opening a socket and moving to another computer, and/or otherwise hijacking a component of the infected computer. A network-based threat may be a virus, PHISH or SPAM that is communicated to a recipient via email or instant messaging software applications.

When a threat is detected at a particular computer, one or more security software programs perform various tasks to identify and mitigate the network-based threat. For example, such security programs may be configured to quarantine the network-based threat from critical areas of memory on the infected computer and/or remove the threat altogether. Security programs may also notify a user of the infected computer and/or a security service (e.g., online security subscription) as to the detection of the network-based threat. In addition, the security programs may halt or terminate processes that require a connection with a network (e.g., the Internet), such as a browser window, messaging software, an email client application, a file-sharing program, and the like. Accordingly, the user is prevented from exchanging data such as instant messages, files, and/or email with other computers.

Such security programs, however, do not notify a recipient computing device that it has received a network-based threat transmitted via an email or instant message from another computer. The recipient is therefore most likely unaware of the arrival and/or presence of the network-based threat. As a result, the network-based threat may be causing harm to the recipient computer or may be lying dormant in preparation of an attack on the recipient. Unfortunately, the recipient experiences a significant amount of disruption in productivity and/or damage to the recipient computer during the time period before the network-based threat is detected and/or removed.

Therefore, there is a need in the art for a method and apparatus for notifying a computer data recipient that a threat was previously communicated to the recipient.

SUMMARY OF THE INVENTION

Embodiments of the present invention generally relate to a method and apparatus for notifying a recipient of a threat within previously communicated data. In one embodiment, a method for alerting recipients as to a potential threat comprises analyzing information regarding network activity amongst at least two computers to determine a threat communicated to a computer of the at least two computers and notifying the computer as to the communication of the threat.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The disclosed embodiments of the present invention provide a method and apparatus for notifying the recipients of an infected computer message that they have received a network-based threat (e.g., SPAM, phish, virus, malware and the like.) Additional tasks to address the received network-based threat may be performed, such as updating security software (e.g., Norton Anti-virus) on the recipient computer with the latest code-based and activity-based signature files, definitions and any other information needed to detect the threat and mitigate any harmful effects, automatically implementing an updated security scan on the recipient computer, and/or instructing the recipient to perform a security scan.

Figure 1:
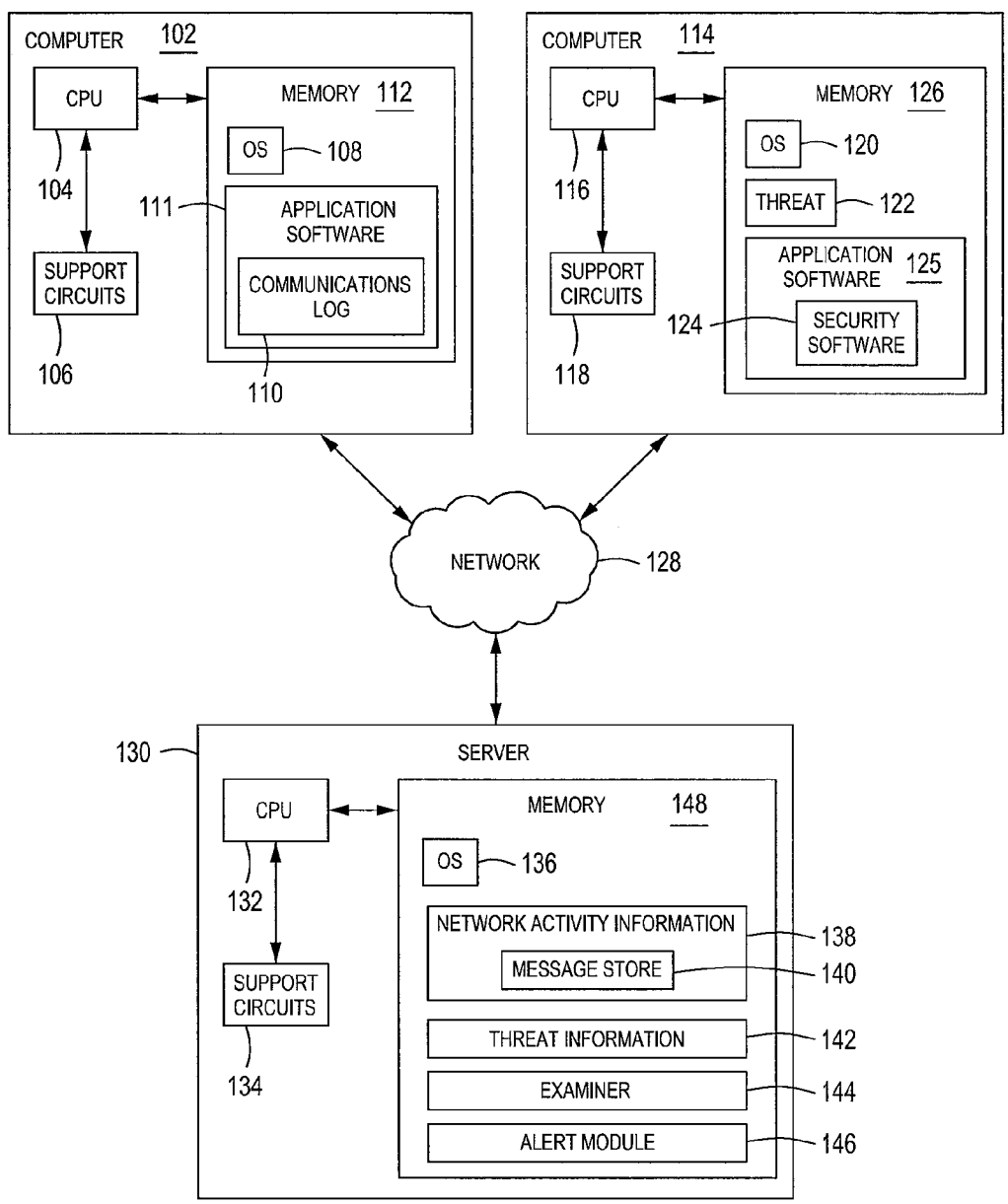
FIG. 1 is a block diagram of a system for notifying a recipient of a threat in accordance with one or more embodiments of the present invention.

FIG. 1 is a block diagram of a system 100 for notifying one or more computer recipients of a threat that was transmitted within previously communicated data in accordance with one or more embodiments of the present invention. The system 100 comprises a computer 102, a computer 114, and a server 130. The computer 102, computer 114, and server 130 are communicably coupled via a communication network 128. In alternative embodiments, the computer 114 may be one of a plurality of computers $114_1$, $114_2$ ... $114_n$ in the computer system 100. The server 130 may be a local server (e.g., Exchange server, Microsoft Office Communications Server, and the like) or a gateway server to the Internet (e.g., the computer 114) for the computer 102.

The computer 114 may be either located within or outside of a local network formed by the computer 102 and the server 130. For example, the computer 102 and the computer 114 may be workstations in an office computer network. As another example, the computer 114 may be a home computer that communicates with the computer 102 through the Internet. Alternatively, the computer 114 may be a mobile phone that communicates with the computer 102 through a cellular network and/or the Internet.

The computer 102 is a computing device that comprises at least one central processing unit (CPU) 104, support circuits 106, and a memory 112. The CPU 104 may comprise one or more conventionally available microprocessors. The support circuits 106 are well known circuits used to promote functionality of the CPU 104. Such circuits include, but are not limited to, a cache, power supplies, clock circuits, I/O circuits, and the like. The memory 112 of the computer 102 may comprise random access memory, read only memory, removable disk memory, flash memory, and various combinations of these types of memory. The memory 112 is sometimes referred to as main memory and may, in part, be used as cache memory or buffer memory. The memory 112 generally stores the operating system 108 of the computer 102. The operating system 108 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

Furthermore, the memory 112 stores various forms of software, such as application software 111 for communicating data (e.g., between the computer 102 and another computing device, such as the computer 114). For example, the application software 111 may include email or instant messaging applications, such as MICROSOFT OUTLOOK, AOL INSTANT MESSANGER, SKYPE and/or the like. The application software 111 further comprises a communications log 110. The communications log 110 comprises message data that was previously communicated from the computer 102. In one embodiment, the communications log 110 may include one or more emails (e.g., a sent folder). Alternatively, the communications log 110 may include one or more instant messages (e.g., a history of instant message conversations).

The computer 114 comprises at least one central processing unit (CPU) 116, support circuits 118, and a memory 126. The CPU 116 may comprise one or more conventionally available microprocessors. The support circuits 118 comprise well known circuits used to facilitate the operations of the CPU 116. Such circuits include, but are not limited to, a cache, power supplies, clock circuits, I/O circuits, and the like. The memory 126 of the computer 114 may comprise random access memory, read only memory, removable disk memory, flash memory, and various combinations of these types of memory. The memory 126 is sometimes referred to as main memory and may, in part, be used as cache memory or buffer memory. The memory 126 generally stores the operating system 120 of the computer 114. The operating system 120 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

Additionally, the memory 126 stores various forms of application software 125, such as security software 124. The security software 124 (e.g., SYMANTEC NORTON products) may be configured to secure the computer 114 from various threats (e.g., network-based threats such as viruses, malware and/or the like). For example, the security software 124 may scan the memory 126 in order to detect and/or remove a virus and/or malware. Furthermore, the security software 124 may be configured to remedy any damage caused by the virus or malware. As such, the memory 126 may comprise a threat 122 (e.g., a network-based threat, such as a virus or malware) that was received as part of a message (e.g., email, instant message and/or the like) sent from another computing device, such as the computer 102.

The server 130 is a computing device that comprises at least one central processing unit (CPU) 132, support circuits 134, and a memory 148. As mentioned above, the server 130 may couple the computer 102 and another computing device, such as the computer 114. As such, data (e.g., message data, file data and the like) communicated between the computer 102 and the computer 114 may be routed through the server 130 according to one embodiment of the present invention. The CPU 132 may comprise one or more conventionally available microprocessors. The support circuits 134 are well known circuits used to promote the functionality of the CPU 132. Such circuits include, but are not limited to, a cache, power supplies, clock circuits, I/O circuits, and the like.

The memory 148 of the server 130 may comprise random access memory, read only memory, removable disk memory, flash memory, and various combinations of these types of memory. The memory 148 is sometimes referred to as main memory and may, in part, be used as cache memory or buffer memory. The memory 148 generally stores the operating system 136 of the server 130. The operating system 136 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like. The memory 148 further includes various data, such as network activity information 138 and threat information 142. Additionally, the memory 148 further includes various software packages, such as an examiner 144 and an alert module 146.

In operation, the examiner 144 and the alert module 146 cooperate to notify one or more recipients of one or more threats (e.g., network-based threats such as malware, SPAM, viruses, PHISH and/or the like) that were communicated through message data (e.g., an email or an instant message). In one embodiment, the examiner 144 and the alert module 146 cooperate to notify the computer 114 that the threat 122 was transmitted through an email or an instant message sent from the computer 102 to the computer 114. In such an embodiment, the examiner 144 analyzes the network activity information 138 and determines that the threat 122 was received at the computer 114. Subsequently, the alert module 146 communicates a message or a notification to the computer 114 regarding the previous transmission of the threat 122.

In one embodiment, the network activity information 138 may be analyzed to determine whether a particular threat (i.e., the threat 122) may have been included within data that was previously communicated from the computer 102. In one embodiment, the network activity information 138 includes information regarding one or more messages (e.g., instant messages and/or emails) transmitted to another computing device, such as the computer 114. For example, the server 130 may include IMLOGIC software where the network activity information 138 indicates content, one or more involved users and/or one or more transferred files for each instant message conversation (i.e., one or more instant messages exchanged during a period of time).

As another example, the server 130 may include MICROSOFT EXCHANGE software where the network activity information 130 indicates a sender, one or more recipients, a subject and/or one or more attached files for each email. In such an example, the network activity information 138 may include a message store as described further below. As another example, the server 130 may include archiving software (e.g., ENTERPRISE VAULT) where the network activity information 138 comprises an archive for the one or more messages that were previously communicated from the computer 102. As such, the network activity information 138 indicates content, one or more recipients and/or one or more transferred (e.g., attached) files for each archived message of the one or more archived messages in the archive.

In one embodiment, the server 130 may be configured as a MICROSOFT EXCHANGE server that comprises the network activity information 138 that is associated with one or more emails exchanged between the computer 102 and one or more other computers, such as the computer 114, through a MICROSOFT OUTLOOK software application. The network activity information 138 comprises a message store 140 for maintaining a plurality of mailboxes that are used for sending and/or receiving the one or more emails. Accordingly, the examiner 144 may access the message store 140 to analyze the one or more emails (i.e., one or more previously communicated emails) using the threat information 142 in order to determine if a threat was also transmitted along with any email of the one or more emails, such as the threat 122 that was received by the computer 114 from the computer 102. For example, the threat 122 may be attached to or hidden within an email of the one or more emails in the message store 140 that was previously communicated from the computer 102 (e.g., to the computer 114).

In order to establish a previous transmission of the threat, the examiner 144 compares the one or more previously communicated emails within the message store 140 with the threat information 142 according to one embodiment. Generally, the threat information 142 comprises information used to identify, detect and/or mitigate various threats to the security of a computer (e.g., network-based threats). In one embodiment, the threat information 142 may comprise definitions and/or one or more code-based or activity-based signatures for detecting the various threats (e.g., malware, SPAM, PHISH and/or the like) or a blacklist of IP (Internet Protocol) addresses associated with malware, SPAM and/or PHISH. As such, the examiner 144 may perform the comparison between the one or more previously communicated emails within the message store 140 with the threat information 142 to identify the threat within with the previously communicated emails as well as to access information regarding the identified threat (e.g., from SYMANTEC THREAT EXPLORER), such as a risk level, behavior details, version information, removal information and/or the like.

Alternatively, the examiner 144 analyzes the communications log 110 that resides on the computer 102 to determine whether previously communicated data comprises a threat, such as the threat 122 received by the computer 114. In one embodiment, the examiner 114 accesses the communication log 110 on the computer 102 and compares one or more messages (e.g., one or more emails or instant messages) to the threat information 142. For example, the examiner 144 accesses the one or more messages from a sent folder of an email application or a conversation history of an instant messaging application.

In one embodiment, the examiner 144 analyzes previously communicated messages (e.g., emails, instant messages and/or the like) in the network activity information 138 (e.g., the message store 140 and/or the communications log 110) to identify a threat in response to an update to the threat information 142. In one embodiment, the update indicates and/or describes a recent threat and/or a new threat detection/removal technique. For example, the update may comprise a virus definition for a new virus. When the virus definition updates the threat information 142, the examiner 144 compares the previously communicated messages to the updated treat information 142 to determine if the new virus was included within any message of the previously communicated messages.

According to one or more embodiment, once a previously communicated message that comprises the threat 122 is identified, the alert module 146 generates a notification (e.g., an internal notification or a message, such as an email or an instant message) to be communicated to the recipient, such as the computer 114. The alert notifies the computer 114 as to the previous communication and receipt of the threat 122. In one embodiment, if the computer 114 has not yet accessed the previously communicated message, the alert module 146 removes the previously communicated message from the computer 114. For example, if a user has not yet opened an email containing the threat 122, the alert module 146 may use a RECALL feature for the MICROSOFT OUTLOOK software application to remove the email from the computer 114.

Alternatively, the alert module 146 may communicate directly with the security software 124 (e.g., at the anti-malware level) according to various embodiments of the present invention. In one embodiment, the alert module 146 may also instruct the security software 124 to initiate a security scan of the computer 114 in order to detect, mitigate and/or remove the threat 122. In another embodiment, the alert module 146 may automatically update the security software 124 with recent threat information, such as a recent signature, definition or removal technique for the threat 122. Alternatively, the alert module 146 may instruct the security software 124 to acquire (i.e., download) the recent threat information from a security service (e.g., SYMANTEC NORTON LIVEUPDATE) to facilitate the security scan of the computer 114.

Figure 2:
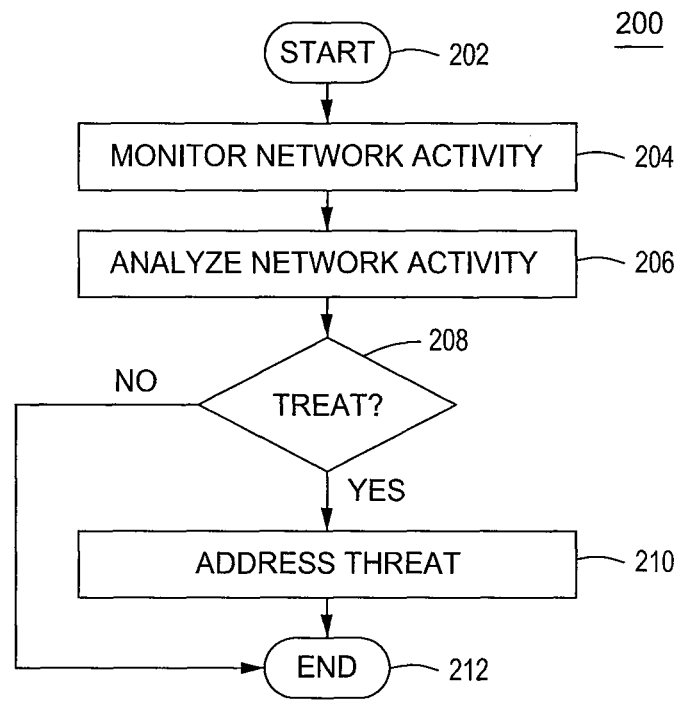
FIG. 2 is a flow diagram of a method for notifying a recipient of a threat in accordance with one or more embodiments of the present invention.

FIG. 2 is a flow diagram of a method 200 for notifying a recipient of a threat within previously communicated data in accordance with one or more embodiments of the present invention. The method 200 starts at step 202 and proceeds to step 204, where network activity is monitored to identify previous messages, such as emails, instant messages, and the like, exchanged between computers. In one embodiment, a communication log at a client computer is examined to identify transmitted messages that originated from that computer. In another embodiment, a message store on a MICROSOFT EXCHANGE server is examined to identify transmitted messages.

At step 206, the network activity is analyzed to determine whether any previously communicated messages comprise the threat (e.g., a network-based threat). In one embodiment, information used in the analysis comprises one or more definitions, code-based or activity-based signatures and/or removal techniques for the threat (e.g., malware, SPAM, PHISH and/or the like). In another embodiment, the information comprises a blacklist of IP addresses associated with malware, SPAM and/or PHISH.

Figure 4:
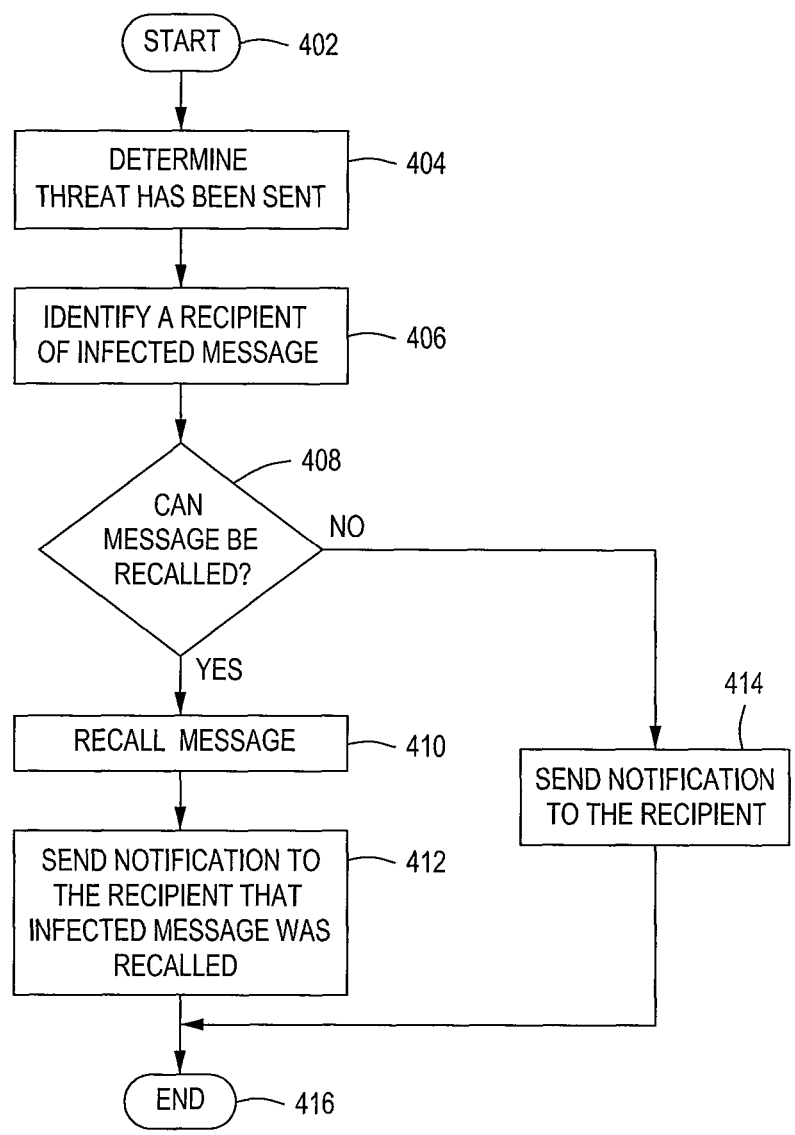
FIG. 4 is a flow diagram of a method for sending a notification to a recipient to address a previously communicated threat in accordance with one or more embodiments of the present invention.
Figure 5:
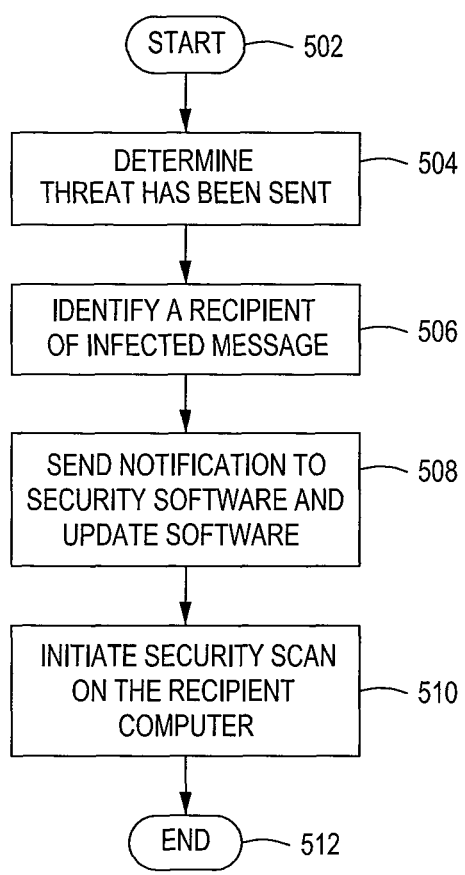
FIG. 5 is a flow diagram of a method for communicating with security software on a recipient computer to address a previously communicated threat in accordance with one or more embodiments of the present invention.

The method proceeds to step 208, where a determination is made as to whether a previously communicated message comprises a threat. If threat is not detected, the method 200 proceeds to step 212 where the method 200 terminates. If a threat is detected, the method 200 proceeds to step 210 where the threat is addressed. The threat may be addressed by several different methods as shown in FIGS. 4 and 5 and further described below. The method 200 then concludes at step 212.

Figure 3:
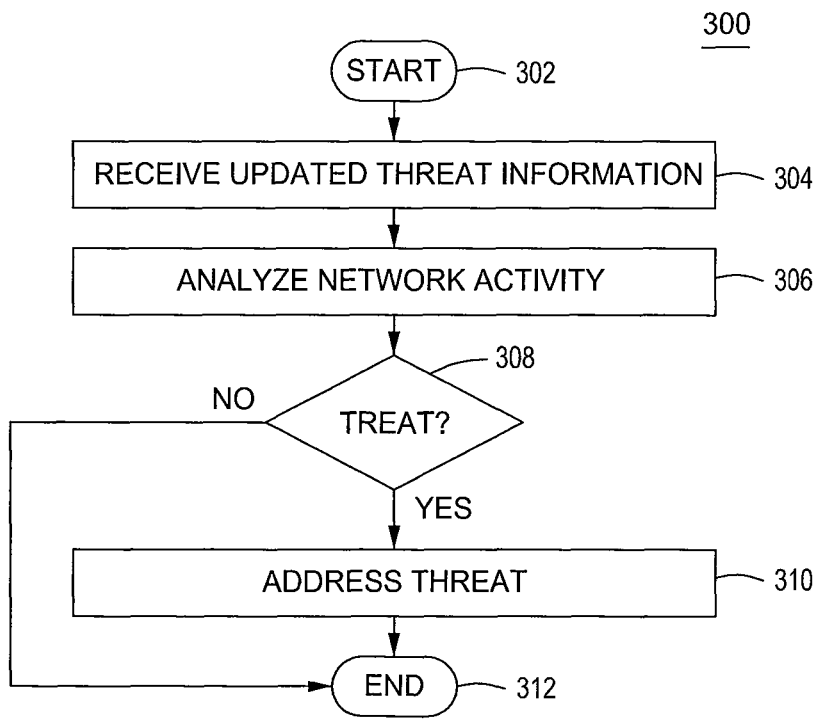
FIG. 3 is a flow diagram of a method for notifying a recipient of a threat in response to an update of security software in accordance with one or more embodiments of the present invention.

FIG. 3 is a flow diagram of a method 300 for notifying a recipient of a threat within previously communicated data in response to an update to security software in accordance with one or more embodiments of the present invention. The method 300 starts at step 302 and proceeds to step 304, where an update is received regarding recent threat information. The update comprises information regarding recent malware, SPAM/PHISH websites, viruses, Phishing techniques and any other information for new threat. The update may further include new detection, removal and/or mitigation techniques for the new threat.

At step 306, network activity between two or more computers is analyzed. In one embodiment, one or more messages previously communicated between the two or more computers, such as emails, instant messages, and the like, are analyzed to determine whether a previously communicated message comprises the threat. The one or more previously communicated messages may be stored locally on client machines, or may be stored on a server (e.g., an EXCHANGE server). The method proceeds to step 308, where a determination is made as to whether any previously communicated message of the one or more previously communicated message comprises the threat. If the threat is not detected, the method 300 proceeds to step 312 where the method 300 terminates. If the threat is detected, the method 300 proceeds to step 310 where the threat is addressed. The threat may be addressed by several different methods as shown in FIGS. 4 and 5 and further described below. The method 300 then concludes at step 312.

FIG. 4 is a flow diagram of a method 400 for sending a notification to a recipient to address a previously communicated threat in accordance with one or more embodiments of the present invention. The method 400 starts at step 402 and proceeds to step 404, where it is determined that a previously communicated message sent to one or more computers comprises a threat. The steps to make this determination are those previously described in the method 200 and the method 300.

At step 406, one or more recipients of the infected message (i.e., the message comprising the threat) are identified. In one embodiment, a communication log at a client computer where the message originated may be used to identify the recipient. In another embodiment, a message store on a server may be used to identify the recipient. At step 408, it is determined whether the infected message can be recalled. If the infected message may be recalled (e.g., because the infected message was not yet opened), the infected message is recalled at step 410. At step 412, a notification (e.g., an alert) is sent to the recipient to notify the recipient of the previous communication of the threat and that the infected message was recalled successfully. The method 400 then proceeds to step 416 where the method 400 concludes.

If the infected message cannot be recalled, the method 400 proceeds to step 414. Accordingly, a notification (e.g., an email or an instant message) is sent to the recipient to notify the recipient that they have received the infected message. Additionally, the notification may identify the infected message and/or suggest that the recipient update security software with recent threat information and/or perform a security scan on the recipient computer. The method 400 then proceeds to step 416 where the method 400 concludes.

FIG. 5 is a flow diagram of a method 500 for communicating with security software on a recipient computer to address a previously communicated threat in accordance with one or more embodiments of the present invention. The method 500 starts at step 502 and proceeds to step 504, where it is determined that a previously communicated message sent to one or more computers comprises a network-based threat. The steps to make this determination are those previously described in the method 200 and the method 300.

At step 506, one or more recipients of the infected message (i.e., the message comprising the threat) are identified. At step 508, a notification (e.g., internal notification at the anti-malware level) is sent to the security software (e.g., the security software 124 of FIG. 1) of the recipient computer. In one embodiment, the security software is automatically updated with recent threat information. In another embodiment, the threat information is used to detect, remove and/or mitigate the previously communicated threat. The method 500 then proceeds to step 510, where a security scan is initiated on the recipient computer. In one embodiment, the notification instructs the security software to perform the security scan. The method 500 then ends at step 512.

While the foregoing is directed to embodiments of the present invention, other and further embodiments of the invention may be devised without departing from the basic scope thereof, and the scope thereof is determined by the claims that follow.

The invention claimed is:

1. A method for alerting recipients as to a previously-communicated threat, comprising:
   analyzing information regarding network activity amongst at least two computers to determine a threat previously communicated to a computer of the at least two computers, wherein analyzing the information regarding network activity comprises:
      examining a plurality of messages exchanged between the at least two computers to identify a message that comprises the threat, wherein the plurality of messages comprises emails, instant messages, or a combination thereof;
      processing information associated with a plurality of threats;
      identifying the threat previously communicated to the computer based on the information associated with the plurality of threats;
      recalling the message that comprises the threat upon determining that the message has not been opened; and
      notifying, via an electronic notification, the computer as to the previous communication of the threat, wherein the electronic notification comprises at least one of an email, an instant message, and an electronic text message.

2. The method of claim 1, wherein notifying the computer further comprises removing a message at the computer, wherein the message comprises the threat.

3. The method of claim 1, wherein notifying the computer further comprises generating an alert to be communicated to the computer, wherein the alert indicates that the threat was previously communicated to the computer.

4. The method of claim 3, wherein the alert is communicated to security software associated with the computer.

5. The method of claim 1, wherein notifying the computer further comprises instructing security software at the computer to scan a memory at the computer to detect the threat.

6. The method of claim 1, wherein notifying the computer further comprises analyzing a memory of the computer to identify indicia of the threat.

7. The method of claim 1, wherein notifying the computer further comprises instructing the computer to update security software with information regarding the threat.

8. The method of claim 1, wherein notifying the computer further comprises automatically updating security software at the computer with information regarding the threat.

9. The method of claim 1, wherein the threat comprises at least one of a virus, a SPAM, a Trojan, a PHISH or malicious software.

10. The method of claim 1, wherein analyzing the information regarding network activity further comprises examining a message store for maintaining a plurality of emails exchanged between the at least two computers to identify an email that comprises the threat.

11. The method of claim 1, wherein analyzing the information regarding network activity further comprises analyzing the information regarding network activity amongst the at least two computers to determine the threat communicated to the computer of the at least two computers is to occur in response to an update of threat information, wherein the update is associated with the threat.

12. An apparatus for alerting recipients as to a previously-communicated threat, comprising:
   a data storage comprising information associated with a plurality of threats;
   an examiner for comparing network activity information with information regarding the plurality of threats to identify a threat previously communicated from a first computer to a second computer based on the information associated with the plurality of threats, wherein the network activity information is associated with data communicated between the first computer and the second computer, and wherein the examiner accesses and examines a plurality of messages communicated between the first computer and the second computer to determine a message communicated to the second computer that comprises the threat, wherein the message that comprises the threat is recalled upon determining that the message has not been opened, where in the plurality of messages comprises emails, instant messages, or a combination thereof; and
   an alert module for notifying, via an electronic notification, the second computer as to the previous communication of the threat, wherein the electronic notification comprises at least one of an email, an instant message, and an electronic text message.

13. The apparatus of claim 12, wherein the examiner processes a message store for maintaining a plurality of emails communicated between the first computer and the second computer to determine an email that comprises the threat.

14. The apparatus of claim 12, wherein the alert module automatically updates security software at the second computer with information regarding the threat.

15. A system for alerting a recipient as to a previously-communicated threat, comprising:
   a first computer;
   a second computer for exchanging data with the first computer, comprising security software for performing a security scan; and
   a server for monitoring the data exchanged between the first computer and the second computer, comprising:
      a data storage comprising information associated with a plurality of threats;
      an examiner for processing the data exchanged between the first computer and the at least one second computer to identify the threat previously communicated to the second computer based on the information associated with the plurality of threats information for determining a threat, wherein the examiner accesses and examines a plurality of messages communicated between the first computer and the second computer to determine a message communicated to the second computer that comprises the threat, wherein the message that comprises the threat is recalled upon determining that the message has not been opened, where in the plurality of messages comprises emails, instant messages, or a combination thereof; and
      an alert module for notifying, via an electronic notification, the second computer as to the previous communication of the threat, wherein the electronic notification comprises at least one of an email, an instant message, and an electronic text message.

16. The system of claim 15, wherein the alert module automatically updates the security software at the second computer.

17. The system of claim 15, wherein the alert module communicates a notification to the security software to prompt the performance of the security scan.

* * * * *